United States Patent
Di Fabbrizio et al.

(10) Patent No.: US 11,972,467 B2
(45) Date of Patent: Apr. 30, 2024

(54) QUESTION-ANSWER EXPANSION

(71) Applicant: Vui, Inc., Boston, MA (US)

(72) Inventors: Giuseppe Di Fabbrizio, Brookline, MA (US); Phil C. Frank, Cohasset, MA (US); Evgeny Stepanov, Povo (IT); Giuliano Tortoreto, Cavedine (IT); Giovanni De Toni, Trento-Alto Adige (IT)

(73) Assignee: Vui. Inc., Boston, MA (US)

( * ) Notice: Subject to any disclaimer, the term of this patent is extended or adjusted under 35 U.S.C. 154(b) by 269 days.

(21) Appl. No.: 17/493,218

(22) Filed: Oct. 4, 2021

(65) Prior Publication Data
US 2023/0106590 A1    Apr. 6, 2023

(51) Int. Cl.
*G06Q 30/00* (2023.01)
*G06F 16/9032* (2019.01)
*G06F 16/906* (2019.01)
*G06F 40/30* (2020.01)
*G06N 20/00* (2019.01)
*G06Q 30/0601* (2023.01)

(52) U.S. Cl.
CPC ... *G06Q 30/0625* (2013.01); *G06F 16/90332* (2019.01); *G06F 16/906* (2019.01); *G06F 40/30* (2020.01); *G06N 20/00* (2019.01)

(58) Field of Classification Search
CPC ................................................. G06Q 30/06–08
See application file for complete search history.

(56) References Cited

U.S. PATENT DOCUMENTS

| 10,706,450 | B1* | 7/2020 | Tavernier | G06F 16/9535 |
| 2019/0138595 | A1* | 5/2019 | Galitsky | G06N 20/10 |
| 2019/0163500 | A1* | 5/2019 | Daianu | G06N 20/20 |
| 2019/0325068 | A1 | 10/2019 | Lai et al. | |

FOREIGN PATENT DOCUMENTS

EP    2447903 A1    5/2012

* cited by examiner

*Primary Examiner* — Ethan D Civan
(74) *Attorney, Agent, or Firm* — Mintz Levin Cohn Ferris Glovsky and Popeo, P.C.

(57) ABSTRACT

A method includes receiving data characterizing a query for information associated with a first item of a plurality of items in an item catalog. The method also includes determining an attribute of the first item. The determining can be performed using a predictive model trained using question-answer pair data associated with a portion of the plurality of items. The portion can include a second item. The method can further include determining an attribute value of the attribute using a mapping of attributes and attribute values associated with the plurality of items in the item catalog. The method can also include providing, as an answer to the query, a characterization of the attribute value. Related systems, methods, apparatus, and computer readable mediums are also described.

29 Claims, 9 Drawing Sheets

QUESTION-ANSWER EXPANSION

BACKGROUND

Catalogs of items or products can be provided in electronic formats, such as web sites, and can include listings of items or products, attributes of the items or products, and a specific attribute value corresponding to the attribute. Some web sites can include interactive portions configured to receive user inputs, for example, as questions, regarding a particular item or an attribute of the item. A large number of inputs may be received in regard to some items, while fewer inputs may be received for other items. As a result, more popular items may be associated with greater amounts of user input data than less popular items. When an input is received in regard to a less popular item it can be necessary to generate an accurate response rapidly. Answers to user provided questions for more popular products can be expanded and used to generate answers for user provided questions about less popular products based on attributes of the products.

SUMMARY

In an aspect, a method includes receiving data characterizing a query for information associated with a first item of a plurality of items included in an item catalog. The method can also include determining an attribute of the first item. The determining can be performed using a predictive model trained using question-answer pair data associated with a portion of the plurality of items. The portion can include a second item. The method can further include determining an attribute value of the attribute using a mapping of attributes and attribute values associated with the plurality of items in the item catalog. The method can also include providing, as an answer to the query, a characterization of the attribute value.

One or more of the following features can be included in any feasible combination. For example, the portion of the plurality of items can include the first item. Determining the attribute can include determining a query type associated with the query. The query type can be determined based on classifying the query prior to determining the attribute of the first item. The query type can include at least one of a factoid type, a confirmation type, a subjective type, an opinion type, or a miscellaneous type. The query type can be determined based on at least one of a clustering similarity metric, a text classification similarity metric, or retrieved information. The attribute value can be determined based on at least one of matching the attribute value to attribute values in the item catalog, a clustering similarity metric of the attribute value and at least one attribute value in the item catalog, a text classification similarity metric of the attribute value and at least one attribute value in the item catalog, or retrieved information corresponding to the attribute.

Determining the attribute can further include extracting a topic of the query and determining the attribute based on the topic of the query. Determining the attribute can further include determining a similarity metric between the attribute and one or more attributes included in the mapping of attributes and attribute values and providing an updated mapping of attributes and attribute values including the determined attribute. Providing the updated mapping of attributes and attribute values can also include applying a threshold to the similarity metric and selecting an attribute whose similarity metric is above the threshold for inclusion in the updated mapping of attributes and attribute values.

Providing the answer can further include generating the answer using a natural language engine based on the updated mapping of attributes and attribute values.

Training the predictive model can include clustering the question-answer pair data associated with the plurality of items in the item catalog. The question-answer pair data can include a first data element characterizing a query by a user for information associated with an item and a second data element characterizing a natural language answer to the query. Training the predictive model can also include determining at least one centroid question based on the clustering and categorizing the question-answer pair data base don the clustering. Training the predictive model can further include removing at least one outlier from the categorized question-answer pair data. Training the predictive model can also include associating an attribute with each question-answer pair included in the question-answer pair data.

The query information can be received from a user in an electronic commerce platform. The item catalog can include a listing of the plurality of items, a listing of one or more attributes associated with each item of the plurality of items, and a listing of one or more attribute values associated with each of the one or more attributes. The attribute can include at least one of an item size, an item dimension, an item shape, an item configuration, an item feature, an item availability, an item component, an item ranking, an item capacity, an item usage, and/or an item price.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

DESCRIPTION OF DRAWINGS

These and other features will be more readily understood from the following detailed description taken in conjunction with the accompanying drawings, in which.

Figure 1:
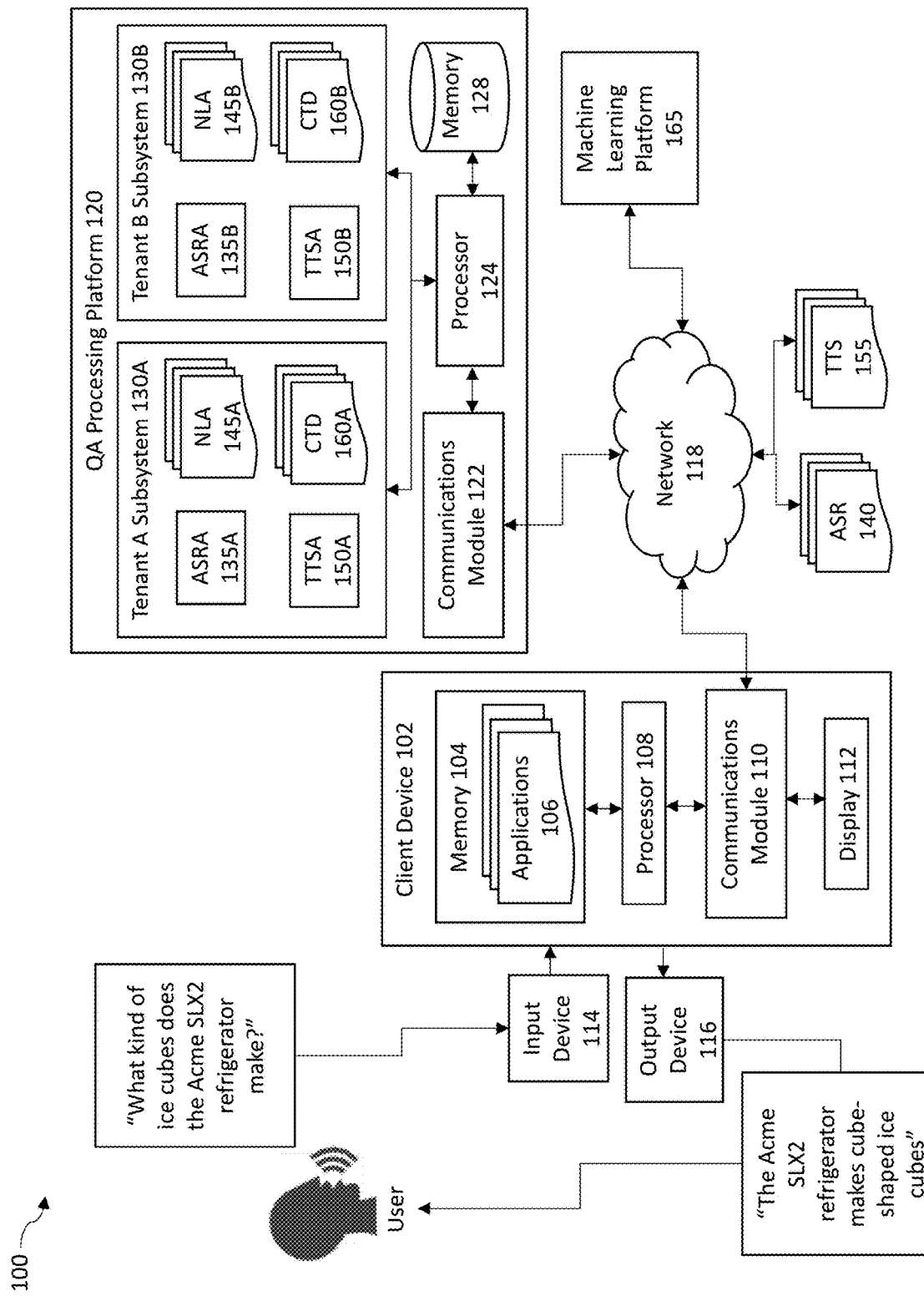
FIG. 1 illustrates an example architecture of a question-answer (QA) expansion system including a catalog to dialog processing subsystem, a client device, and a machine learning platform.

It is noted that the drawings are not necessarily to scale. The drawings are intended to depict only typical aspects of the subject matter disclosed herein, and therefore should not be considered as limiting the scope of the disclosure.

DETAILED DESCRIPTION

Determining answers to user queries associated with an item or product can require extensive amounts of pre-configured data about the item or product. For example, a query provided by a user in regard to an attribute or feature of an item may be processed using a stored listing of the attributes and values of the attributes. The stored attribute data must be updated frequently as new items are added to an item catalog and can require additional human and computing resources to identify, add, and link attributes of the newly added product. When a user provided query is received in regard to an item which has been recently added to an item catalog, existing query response systems may fail to generate a response because of the lack of existing information about one or more attributes of the new item. If the query response system relies on question-answer data collected from other sources, there may not be sufficient data available regarding the attributes of less popular items as compared to more popular items. Thus, existing query response systems may be limited in their ability to generate responses for queries associated with new or less popular items in an item catalog.

In some implementations, the approach to question-answer expansion described herein can include generating query responses for new items of an item catalog or items for which existing question-answer data related to a specific product attribute is limited or incomplete. By determining a topic of a user provided query associated with an item included in an item catalog, some implementations of the question-answer expansion approach can provide a query response. The question-answer expansion approach can determine the query-response based on a mapping of attributes and attribute values. In some implementations, the question-answer expansion approach can determine the query response based on similar query topics that have been received in relation to other similar products which include the same attribute as the topic of the originally received query. A predictive model can be trained using question-answer pair data associated with items in an item catalog to determine the topic of the query and to generate a query response. The query response can be provided to a user in a natural language format.

The question-answer expansion system can provide query responses for products which may be newly listed in an item catalog or for which a full mapping of attributes and attribute values has not yet been established. Thus, some implementations of the question-answer expansion approach described herein can enable rapid start up and bootstrapping of item attribute data in an e-commerce platform or an item catalog interface. As a result, user query responses can be generated accurately and more quickly than existing systems, which can require extensive manual configuration of the attribute and attribute value mappings needed to generate query responses in regard to a particular item or product. Some implementations of the example question-answer expansion approach described herein can enable an enhanced user experience for search or query related tasks to provide users with a fulfilling interactive dialog when searching or inquiring about item attributes in an e-commerce platform, web site, or the like for new items or items in which minimal attribute data may be available.

FIG. 1 illustrates an example architecture of a question-answer (QA) expansion system 100 including a client device 102, a question-answer processing platform 120, and a machine learning platform 165. The client device 102, the QA processing platform 120, and the machine learning platform 165 can be communicatively coupled via a network, such as network 118. In broad terms, a user can provide an input, such as a query or question associated with a product or item, to the client device 102 via input device 114. The client device 102 can be configured as a frontend of the QA expansion system 100. The client device 102 can include one or more applications 106. For example, the applications 106 can include a web browser configured to display a web site that can include a product catalog, a list of items for sale, or a similar electronic commerce platform accessible via the internet. The applications 106 can transmit data associated with the query to a backend of the QA expansion system 100. The QA processing platform 120 can be configured as the backend of the QA expansion system 100 and can receive the data from the client device 102 via the network 118. The QA processing platform 120 can process the transmitted data to generate a response to the user query and can provide the generated response to the client device 102. The client device 102 can then output the query response via the output device 116. In some embodiments, the output device 116 can provide the response in natural language units, such as words.

As shown in FIG. 1, the QA expansion system 100 includes a client device 102. The client device 102 can include a large-format computing device or any other fully functional computing device, such as a desktop computers or laptop computers, which can transmit user data to the dialog processing platform 120. Additionally, or alternatively, other computing devices, such as a small-format computing devices 102 can also transmit user data to the QA processing platform 120. Small-format computing devices 102 can include a tablet, smartphone, intelligent or virtual digital assistant, or any other computing device configured to receive user inputs as voice and/or textual inputs and provide responses to the user as voice and/or textual outputs.

The client device 102 includes a memory 104, a processor 108, a communications module 110, and a display 112. The memory 104 can store computer-readable instructions and/or data associated with processing multi-modal user data via a frontend and backend of the QA expansion system 100. For example, the memory 104 can include one or more applications 106 implementing a web site or similar electronic commerce platform. The applications 106 can provide speech and textual conversational agent modalities to the client device 102. The processor 108 operates to execute the computer-readable instructions and/or data stored in memory 104 and to transmit the computer-readable instructions and/or data via the communications module 110. The communications module 110 transmits the computer-readable instructions and/or user data stored on or received by the client device 102 via network 118. The network 118 connects the client device 102 to the QA processing platform 120. The network 118 can also be configured to connect the machine learning platform 165 to the QA processing platform 120. The network 118 can include, for example, any one or more of a personal area network (PAN), a local area network (LAN), a campus area network (CAN), a metropolitan area network (MAN), a wide area network (WAN), a broadband network (BBN), the Internet, and the like. Further, the network 118 can include, but is not limited to, any one or more of the following network topologies, including a bus network, a star network, a ring network, a mesh network, a star-bus network, tree or hierarchical network, and the like. The client device 102 also includes a display 112. In some implementations, the display 112 can be configured within or on the client device 102. In other implementations, the display 112 can be external to the client device 102. The client device 102 also includes an input device 114, such as a microphone to receive voice inputs, or a keyboard, to receive textual inputs. The client device 102 also includes an output device 116, such as a speaker or a display.

The client device 102 can include one or more of applications 106, which can receive inputs associated with a user query and to provide responses to the users query. For example, as shown in FIG. 1, the client device 102 can receive user queries which are spoken via the input device 114, such as a microphone. In some implementations, the input device 114 can be a keyboard and the user can provide query inputs as textual inputs, in addition to or separately from the inputs provided using a voice-based modality. A user can interact with the input device 114 to provide query data, such as a question, via a web-site or electronic commerce platform at which the user is enquiring about one or more items or products. For example, the user can provide a query asking "What kind of ice cubes does the Acme SLX2 refrigerator make?". The applications 106 can receive the query via the input device 114 and cause processor 108 to transmit the query data to the QA processing platform 120 for processing and to generate a response to the query.

As shown in FIG. 1, the QA expansion system 100 includes a QA processing platform 120. The QA processing platform 120 operates to receive query data, such as questions provided to the client device 102 in regard to a particular item or product, and to process the query data to generate responses to the user in regard to the particular item or product that the user was inquiring about. The QA processing platform 120 can be configured on any device having an appropriate processor, memory, and communications capability for hosting the QA processing platform 120 as described herein. In certain aspects, the QA processing platform 120 can be configured as one or more servers, which can be located on-premises of an entity deploying the QA expansion system 100, or can be located remotely from the entity. In some implementations, the QA processing platform 120 can be implemented as a distributed architecture or a cloud computing architecture. In some implementations, one or more of the components or functionality included in the QA processing platform 120 can be configured in a microservices architecture. In some implementations, one or more components of the QA processing platform 120 can be provided via a cloud computing server of an infrastructure-as-a-service (IaaS) and be able to support a platform-as-a-service (PaaS) and software-as-a-service (SaaS) services.

The QA processing platform 120 includes a communications module 122 to receive the computer-readable instructions and/or user data transmitted via network 118. The QA processing platform 120 also includes at least one processor 124 configured to execute instructions, which when executed cause the processor 124 to perform expansion of QA data for a plurality of items or products identified in an item catalog and to generate contextually specific query responses to user queries. The QA processing platform 120 also includes a memory 128 configured to store the computer-readable instructions and/or user data associated with processing user query data and generating query responses. The memory 128 can store a plurality of item or product catalogs, as well as mappings of item attributes and corresponding attribute values of the items.

As shown in FIG. 1, the QA processing platform 120 includes one or more subsystems such as subsystem 130A and 130B, collectively referred to as subsystems 130. Each subsystem 130 and the components or functionality configured therein can correspond to a particular entity, or tenant, that has configured the QA expansion system 100 to provide responses to user queries regarding a product or item included in a product catalog or item catalog. For example, the QA processing platform 120 can include a first subsystem 130A which can be associated with a first tenant 130A, such as an appliance manufacturer, and a second subsystem 130B which can be associated with a second tenant 130B, such as an ecommerce marketplace hosting a large variety of products from different manufacturers. In this way, the QA processing platform 120 can be configured as a multi-tenant portal to provide query responses and QA expansion for different tenants.

Subsystems 130 can include components implementing functionality to receive query data from users via a variety of multi-modal conversational agents and to generate query responses in the context of a particular item or product associated with a tenant or entity for which the QA processing platform 120 has been deployed. For example, as shown in FIG. 1 in regard to subsystem 130A, the components can include an automatic speech recognition engine adapter (ASRA) 135A for interfacing with a plurality of automated speech recognition (ASR) engines 140, a plurality of natural language agent (NLA) ensembles 145A, a text-to-speech synthesis engine adapter (TTSA) 150 for interfacing to a plurality of text-to-speech (TTS) synthesis engines 155, and a plurality of catalog-to-dialog (CTD) modules 160A. In some implementations, the QA processing platform 120 can include one or more subsystems 130.

The plurality of ASR engines 140, the plurality of NLA ensembles 145, the plurality of TTS synthesis engines 155, and the plurality of CTD modules 160 can be respectfully referred to as ASR engines 140, NLA ensembles 145, TTS synthesis engines 155, and CTD modules 160. In some implementations, the subsystem 130 components can be configured directly within the QA processing platform 120 such that the components are not configured within a subsystem 130. As shown in FIG. 1, the ASR engines 140 and the TTS synthesis engines 155 can be configured outside of the QA processing platform 120, such as in a cloud-based architecture. The QA processing platform 120 can exchange data with the ASR engines 140 and the TTS synthesis engines 155 via the ASRA 135 and the TTSA 150, respectfully. In some implementations, the ASR 140 and/or TTS 155, or portions thereof, can be configured within the QA processing platform 120. In some implementations, the components of the QA processing platform 120, as well as the ASR engines 140 and the TTS synthesis engines 155 can be implemented as microservices within a cloud-based or distributed computing architecture.

As shown in FIG. 1, the QA processing platform 120 includes an ASRA 135A configured to interface with the ASR engines 140. The ASR engines 140 can include automated speech recognition engines configured to receive spoken or textual natural language inputs and to generate textual outputs corresponding the inputs. For example, the ASR engines 140 can process the user's verbalized query or utterance "What kind of ice cubes does the Acme SLX2 refrigerator make?" into a text string of natural language units characterizing the query. The text string can be further processed to determine an appropriate query response based on a product or item catalog associated with the Acme SLX2 refrigerator. The QA processing platform 120 can dynamically select a particular ASR engine 140 that best suits a particular task, dialog, or received user query.

The QA processing platform 120 also includes a plurality of NLA ensembles 145. The NLA ensembles 145 can include a plurality of components configured to receive the text string from the ASR engines 140 or from a keyboard and to process the text string in order to determine a textual response to the user query. The NLA ensembles 145 can include a natural language understanding (NLU) module implementing a number of classification algorithms trained in a machine learning process to classify the text string into a semantic interpretation. The processing can include classifying an intent of the text string and extracting information from the text string. The NLU module combines different classification algorithms and/or models to generate accurate and robust interpretation of the text string. The NLA ensembles 145 can also include a dialog manager (DM) module. The DM module can determine an appropriate dialog action in a contextual sequence formed by a current or a previous dialog sequence conducted with the user when multiple query inputs are received in a dialog. In this way, the DM can generate a response action to increase natural language quality and fulfillment of the user's query objective. The NLA ensembles 145 can also include a natural language generator (NLG) module. The NLG module can process the action response determined by the dialog manager and can convert the action response into a corresponding textual response to be provided to the user as a query response. The NLG module provides multimodal support for generating textual responses to user queries for a variety of different output device modalities, such as voice outputs or visually displayed (e.g., textual) outputs. In some implementations, the ensemble can include a set of models that are included in the NLU and optimized jointly to select the right response.

The QA processing platform 120 also includes a TTSA 150 configured to interface with the TTS synthesis engines 155. The TTS synthesis engines 155 can include text-to-speech synthesis engines configured to convert textual responses to verbalized query responses. In this way, a response to a user's query can be determined as a text string and the text string can be provided to the TTS synthesis engines 155 to generate the query response as natural language speech. The QA processing platform 120 can dynamically select a particular TTS synthesis engine 155 that best suits a particular task, dialog, or generated textual response.

The QA processing platform 120 also includes catalog-to-dialog (CTD) modules 160. The CTD modules 160 can be selected for use based on a profile associated with the tenant or entity. The CTD modules 160 can automatically convert data from a product or item catalog associated with a tenant, as well as billing and order information into a data structure corresponding to a particular tenant or entity for which the QA expansion system 100 is deployed. The CTD modules 160 can derive product synonyms, attributes, attribute values, and natural language queries from product titles and descriptions which can be found in the product or item catalog associated with the tenant. The CTD modules 160 can generate a data structure that is used the machine learning platform 165 to train one or more classification algorithms included in NLU module. In some implementations, the CTD modules 160 can instantiate, create, or implement fully configured conversational agents configured to process user queries and provide query responses for a particular tenant. In some implementations, the CTD modules 160 can be used to efficiently pre-configure the QA expansion system 100 to automatically respond to queries about items, products, or services provided by the tenant. For example, referring back to FIG. 1, the QA processing platform 120 can process the users query to determine a response regarding the type of ice cubes made by the Acme SLX2 refrigerator. As a result of the processing initially described above and to be described in more detail in relation to FIG. 3, the QA processing platform 120 can generate a response to the user's query. The query response can be transmitted to the client device 102 and provided as speech output via output device 116 and/or provided as text displayed via display 112.

The QA expansion system 100 includes a machine learning platform 165. Machine learning can refer to an application of artificial intelligence that automates the development of an analytical model by using algorithms that iteratively learn patterns from data without explicit indication of the data patterns. Machine learning can be used in pattern recognition, computer vision, email filtering and optical character recognition and enables the construction of algorithms or models that can accurately learn from data to predict outputs thereby making data-driven predictions or decisions.

The machine learning platform 165 can include a number of components configured to generate one or more trained prediction models suitable for use in the QA expansion system 100 described in relation to FIG. 1. For example, during a machine learning process, a feature selector can provide a selected subset of features to a model trainer as inputs to a machine learning algorithm to generate one or more training models. A wide variety of machine learning algorithms can be selected for use including algorithms such as support vector regression, ordinary least squares regression (OLSR), linear regression, logistic regression, stepwise regression, multivariate adaptive regression splines (MARS), locally estimated scatterplot smoothing (LOESS), ordinal regression, Poisson regression, fast forest quantile regression, Bayesian linear regression, neural network regression, decision forest regression, boosted decision tree regression, artificial neural networks (ANN), deep neural networks (DNN), Bayesian statistics, case-based reasoning, Gaussian process regression, inductive logic programming, learning automata, learning vector quantization, informal fuzzy networks, conditional random fields, genetic algorithms (GA), Information Theory, support vector machine (SVM), Averaged One-Dependence Estimators (AODE), Group method of data handling (GMDH), instance-based learning, lazy learning, Maximum Information Spanning Trees (MIST), and transfer learning methods based on pre-trained, generalized embeddings as well as domain-based embeddings.

The CTD modules 160 can be used in the machine learning process to train the classification algorithms included in the NLU of the NLA ensembles 145. The model trainer can evaluate the machine learning algorithm's prediction performance based on patterns in the received subset of features processed as training inputs and generates one or more new training models. The generated training models, e.g., classification algorithms and models included in the NLU of the NLA ensemble 145, are then capable of receiving user query data and to output predicted query responses including at least one attribute value associated with the product or item that was the subject of the user's query.

Figure 2:
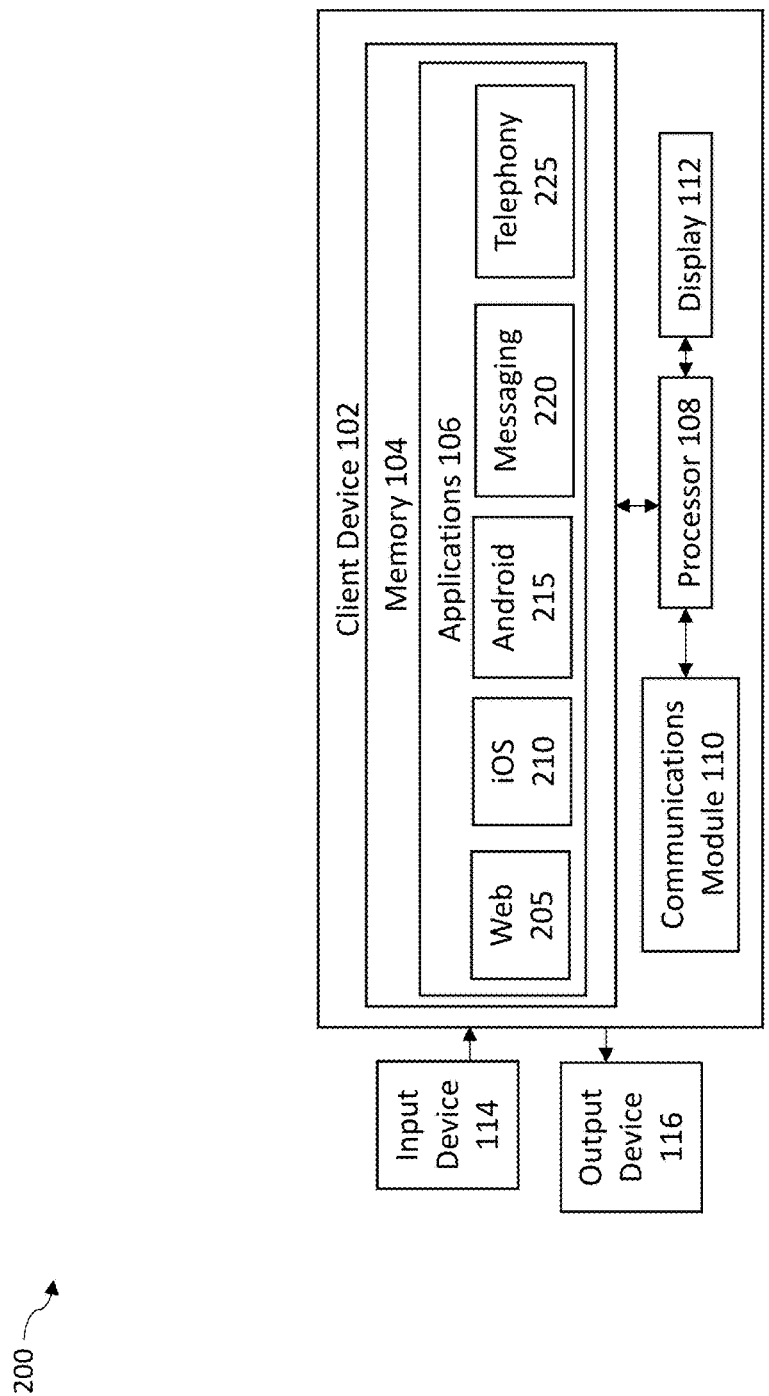
FIG. 2 illustrates an example architecture of a client device of the QA expansion system described in FIG. 1.

FIG. 2 illustrates an example architecture of a client device 102 configured as a multi-modal conversational agent of the QA expansion system 100 described in relation to FIG. 1. As shown in FIG. 2, the client device 102 can include a plurality of applications 106. In some embodiments, the applications 106 can include web-browsers, which can provide web pages associated with a product or item on the client device 102. In some embodiments, the applications 106 can include APIs as JavaScript libraries received from the dialog processing platform 120 and incorporated into a website of the entity or tenant to enable support for text and/or voice modalities via a customizable user interfaces. In some embodiments, the applications 106 can implement client APIs on different client devices 102 and web browsers in order to provide responsive multi-modal interactive graphical user interfaces (GUI) that are customized for the entity or tenant. The GUI and applications 106 can be provided based on a profile associated with the tenant or entity. In this way, the QA expansion system 100 can provide customizable branded assets defining the look and feel of a user interface, different product or item catalogs, as well as query responses for products or items which are specific to the tenant or entity associated with the product or item.

The web application 205 includes functionality configured to enable a web browser on a client device 102 to communicate with the QA processing platform 120. The web application 205 can include a media capture API, a web audio API, a document object model, and a web socket API. The web application 205 can be configured to capture dynamic content generated by the multi-modal conversation agent configured on the client device 102. For example, the dynamic content can include clickable and multimodal interactive components and data. The iOS application 210 includes functionality configured to provide support for multi-modal conversational agents implemented on client devices 102 configured with the proprietary iOS operating system developed by Apple Inc. of Cupertino, California, U.S.A. In some implementations, the interface representation and interactive user model used for a conversational agent configured on a client device web browser can be converted and provided using the same interface representation deployed on a mobile device web browser. The android application 215 includes functionality configured to provide support for multi-modal conversational agents implemented on client devices 102 configured with the Unix-based Android operating system developed by the Open Handset Alliance of Mountain View, California, U.S.A. The messaging application 220 includes functionality configured to provide messaging support for a variety of chat and messaging platforms. In some implementations, the messaging application 220 can reproduce the same interface representation multi-modal experience as enabled on other client device 102 interfaces. The telephony application 225 includes functionality configured to provide telephony support via public switched telephone network (PSTN) devices and voice over internet protocol (VoIP) devices. In some implementations, the telephony application 225 can be configured to generate short conversational prompts or dialog sequences without reference to the content of the screen. Accordingly, the conversational agent system described herein can enable support for smart speaker client devices 102 and the conversational agents configured on the client devices 102 can automatically adapt to the capabilities of different devices.

Figure 3:
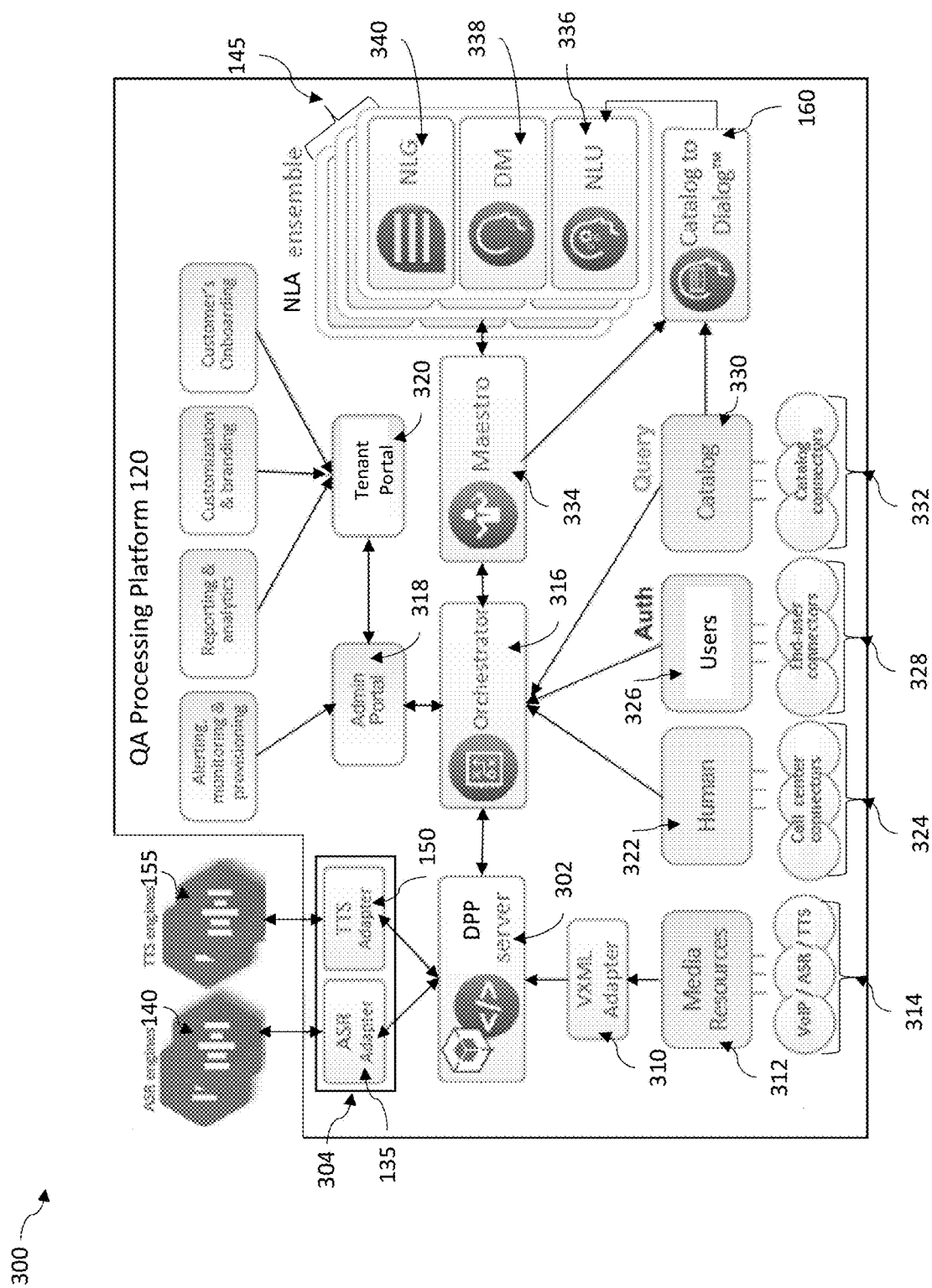
FIG. 3 illustrates an example architecture of a question-answer processing platform of the QA expansion system described herein.

FIG. 3 illustrates an example architecture 300 of a QA processing platform 120 of the QA expansion system 100 described herein. The QA processing platform 120 can serve as a backend of the QA expansion system 100. One or more components included in the QA processing platform 120 shown in FIG. 3 can be configured on a single server device or on multiple server devices. One or more of the components of the QA processing platform 120 can also be configured as a microservice, for example in a cloud computing environment. In this way, the QA expansion system 100 can be configured as a robustly scalable architecture that can be provisioned based on resource allocation demands.

The QA processing platform 120 includes run-time components that are responsible for processing incoming speech or text inputs, determining the meaning in the context of a query and a product or item, and generate query responses to the user which are provided as speech and/or text. Additionally, the QA processing platform 120 provides a multi-tenant portal where both administrators and tenants can customize, manage, and monitor platform resources, and can generate run-time reports and analytic data. The QA processing platform 120 interfaces with a number of real-time resources such as ASR engines 140, TTS synthesis engines 155, and telephony platforms described in relation to FIG. 1. The QA processing platform 120 also provides consistent authentication and access APIs to commercial e-commerce platforms to which it may be coupled via network 118.

As shown in FIG. 3, the QA processing platform 120 includes a dialog processing server (DPP) 302. The DPP server 302 can act as a frontend to the QA processing platform 120 and can appropriately route data received from or to be transmitted to client devices 102 as appropriate. The DPP server 302 routes requests or data to specific components of the QA processing platform 120 based on registered tenant and application identifiers which can be included in a profile associated with a particular tenant. The DPP server 302 can also securely stream to the ASR engines 140 and from the TTS synthesis engines 140.

For example, as shown in FIG. 3, the QA processing platform 120 includes a plurality of adapters 304 configured interface the ASR engines 140 and the TTS synthesis engines 155 to the DPP server 302. The adapters 304 allow the QA processing platform 120 to interface with a variety of speech processing engines, such as ASR engines 140 and TTS synthesis engines 155. In some implementations, the speech processing engines can be configured in a cloud-based architecture of the QA processing platform 120 and may not be collocated in the same server device as the DPP server 302 or other components of the QA processing platform 120.

The adapters 304 include a ASR engine adapter 135 and a TTS synthesis engine adapter 150. The ASR engine adapter 135 and a TTS synthesis engine adapter 150 enable tenants to dynamically select speech recognition and textto-speech synthesis providers or natural language speech processing resources that best suit the users objective, task, dialog, or query.

As shown in FIG. 3, the QA processing platform 120 includes a voiceXML (VXML) adapter 310 which can couple the DPP server 302 to various media resources 312. For example, the media resources 312 can include VoIP networks, ASR engines, and TTS synthesis engines 314. In some implementations, the media resources 312 enable the conversational agents to leverage existing telephony platforms, which can often be integrated with particular speech processing resources. The existing telephony platforms can provide interfaces for communications with VoIP infrastructures using session initiation protocol (SIP). In these configurations, VXML documents are exchanged during a voice call. In some embodiments, additional adaptors 310 can be configured in the QA processing platform 120. For example, the additional adaptors 310 can include adaptors for web-based chat clients, messaging clients, and mobile device clients.

The QA processing platform 120 also includes an orchestrator component 316. The orchestrator 316 provides an interface for administrators and tenants to access and configure the QA expansion system 100. The administrator portal 318 can enable monitoring and resource provisioning, as well as providing rule-based alert and notification generation. The tenant portal 320 can allow customers or tenants of the QA expansion system 100 to configure reporting and analytic data, such as account management, customized reports and graphical data analysis, trend aggregation and analysis, as well as drill-down data associated product or item queries provided by a user. The tenant portal 320 can also allow tenants to configure branding themes and implement a common look and feel for the tenants conversational agent user interfaces. The tenant portal 320 can also provide an interface for onboarding or bootstrapping product or item data. In some implementations, the tenant portal 320 can provide tenants with access to customizable conversational agent features such as user prompts, dialog content, colors, themes, usability or design attributes, icons, and default modalities, e.g., using voice or text as a first modality in a query-response dialog (e.g., a question-answer (QA) dialog). The tenant portal 320 can, in some implementations, provide tenants with customizable content via different ASR engines 140 and different TTS synthesis engines 155 which can be utilized to provide speech data in different voices and/or dialects. In some implementations, the tenant portal 320 can provide access to analytics reports and extract, transform, load (ETL) data feeds.

The orchestrator 316 can provide secure access to one or more backends of a tenants data infrastructure. The orchestrator 316 can provide one or more common APIs to various tenant data sources which can be associated with product or item catalog data, user accounts, order status, order history, and the like. The common APIs can enable developers to reuse APIs from various client side implementations.

The orchestrator 316 can further provide an interface 322 to human resources, such as human customer support operators who may be located at one or more call centers. The QA processing platform 120 can include a variety of call center connectors 324 configured to interface with data systems at one or more call centers.

The orchestrator 316 can provide an interface 326 configured to retrieve authentication information and propagate user authentication and/or credential information to one or more components of the system 300 to enable access to a user's account. For example, the authentication information can identify one or more users, such as individuals who have accessed a tenant web site as a customer or who have interacted with the QA expansion system 100 previously. The interface 326 can provide an authentication mechanism for tenants seeking to authenticate users of the QA expansion system 100. The QA processing platform 120 can include a variety of end-user connectors 328 configured to interface the QA processing platform 120 to one or more databases or data sources identifying end-users. The interface 326 can also enable access to the tenant's customer order and billing data via one or more catalog or e-commerce connectors 328.

The orchestrator 316 can also provide an interface 330 to tenant catalog data sources. The catalog data sources can include a product catalog or an item catalog including a plurality of products or items for which a user may provide a query in regard to. In some embodiments, the catalog data sources can include mappings of product attributes and corresponding attribute values. An attribute of a product or item can be a feature, a component, a product or item size, a product or item dimension, a product or item shape, a product or item configuration, a product or item feature, a product or item availability, a product or item ranking, a product or item capacity, a product or item usage, and/or a product or item price. An attribute value can identify the attribute. For example, a refrigerator can have an ice maker. The ice maker can be an attribute of the refrigerator, as can a shape of ice cubes made by the refrigerator. An attribute value of the shape of the ice cubes can be square, round, semi-circular, or custom, depending on the model of the refrigerator and the manufacturers specifications.

The interface 330 can enable access to the tenant's catalog data which can be accessed via one or more catalog or e-commerce connectors 332. The interface 330 enables access to tenant catalogs and/or catalog data and further enables the catalog data to be made available to the CTD modules 160. In this way, data from one or more sources of catalog data can be ingested into the CTD modules 160 to populate the modules with product or item names, descriptions, brands, images, colors, swatches, as well as structured and free-form item or product attributes and corresponding attribute values.

The QA processing platform 120 also includes a maestro component 334. The maestro 334 enables administrators of the QA expansion agent system 100 to manage, deploy, and monitor conversational agent applications 106 independently. The maestro 334 provides infrastructure services to dynamically scale the number of instances of natural language resources, such as tenant subsystems 130, ASR engines 140, TTS synthesis engines 155, NLA ensembles 145, and CTD modules 160. The maestro 334 can dynamically scale these resources as query-response traffic increases. The maestro 334 can deploy new resources without interrupting the processing being performed by existing resources. The maestro 334 can also manage updates to the CTD modules 160 with respect to updates to the tenants e-commerce data, such as updated to item or product catalogs. In this way, the maestro 334 provides the benefit of enabling the QA processing platform 120 to operate as a highly scalable infrastructure for deploying artificially intelligent multi-modal conversational agent applications 106 for multiple tenants or multiple tenant subsystems 130. As a result, the QA expansion system 100 can reduce the time, effort, and resources required to develop, test, and deploy conversational agents and can also provide more robust query response generation for a large variety of item or product attributes.

The QA processing platform 120 further includes a CTD module 160. The CTD module 160 can implement methods to collect e-commerce data from item or product catalogs, product reviews, user account and order data, and user clickstream data collected at the tenants web site to generate a data structure that can be used to learn specific domain knowledge and to onboard or bootstrap a newly configured QA expansion system 100. The CTD module 160 can extract taxonomy labels associated with hierarchical relationships between categories of products and can associate the taxonomy labels with the products in the tenant catalog. The CTD module 160 can also extract structured product attributes (e.g., categories, colors, sizes, prices) and unstructured product attributes (e.g., fit details, product care instructions) and the corresponding values of those attributes. The CTD module 160 can normalize attribute vales so that the attribute values share the same format throughout the catalog data structure. In this way, noisy values caused by poorly formatted content can be removed.

Products or items in an e-commerce catalogs can be typically organized in a multi-level taxonomy, which can group the products into specific categories. The categories can be broader at higher levels (e.g., there are more products) and narrower (e.g., there are less products) at lower levels of the product taxonomy. For example, a product taxonomy associated with clothing can be represented as Clothing>Sweaters>Cardigans & Jackets. The category "Clothing" is quite general, while "Cardigans & Jackets" are a very specific type of clothing. A user's queries can refer to a category (e.g., dresses, pants, skirts, etc.) identified by a taxonomy label or to a specific product item (e.g., item #30018, Boyfriend Cardigan, etc.). In a web-based search or query session, a query could either start from a generic category and narrow down to a specific product or vice versa. CTD module 160 can extract category labels from the catalog taxonomy, product attributes, attribute types, and attribute values, as well as product titles and descriptions.

The CTD module 160 can automatically generate attribute type synonyms and lexical variations for each attribute type from search query logs, product descriptions, and product reviews, and can automatically extract referring expressions from the tenant product catalog or the user clickstream data. The CTD module 160 can also automatically generate query responses based on the tenant catalog and the lexicon of natural language units or words that are associated with the tenant and included in CTD module 160.

The CTD module 160 utilizes the extracted data to train classification algorithms to automatically categorize catalog data and product attributes included in a natural language query provided by a user. The extracted data can also be used to train a full search engine based on the extracted catalog information. The full search engine can thus include indexes for each product category and attribute. The extracted data can also be used to automatically define a dialog frame structure that will be used by a dialog manger module, described later, to maintain a contextual state of the query response dialog with the user.

As shown in FIG. 3, the maestro 334 can interface with a plurality of natural language agent (NLA) ensembles 145. Each of the NLA ensembles 145 can include one or more of a natural language generator (NLG) module 336, a dialog manager (DM) module 338, and a natural language understanding (NLU) module 340. In some implementations, the NLA ensembles 145 can include pre-built automations, which when executed at run-time, implement query response policies for a particular context of a query response dialog with a user. For example, the pre-built automations can include policies associated with searching, frequently-asked-questions (FAQ), customer care or support, order tracking, and small talk or commonly occurring query response dialog sequences which may or may not be contextually relevant to the user's query. The NLA ensembles 145 can include reusable dialog policies, dialog state tracking mechanisms, domain and schema definitions. Customized NLA ensembles 145 can be added to the plurality of NLA ensembles 145 in a compositional manner as well.

Each NLA ensemble 145 can include at least one of a natural language understanding (NLU) module 336, a dialog manager (DM) module 338, and a natural language generator (NLG) module 340.

As shown in FIG. 3, the NLA ensemble 145 includes a natural language understanding (NLU) module 336. The NLU module 336 can implement a variety of classification algorithms used to classify input text associated with a user query and generated by the ASR engines 140 into a semantic interpretation. In some implementations, the NLU 336 can classify input text when the query incudes customer support requests/questions about products and services. In some implementations, the NLU module 336 can implement a stochastic intent classifier and a named-entity recognizer ensemble to perform intent classification and information extraction, such as extraction of entity or user data. The NLU module 336 can combine different classification algorithms and can select the classification algorithm most likely to provide the best semantic interpretation for a particular user query by determining context of the query response dialog and integrating past query response dialog histories.

The classification algorithms included in the NLU module 336 can be trained in a supervised machine learning process using support vector machines or using conditional random field modeling methods. In some implementations, the classification algorithms included in the NLU module 336 can be trained using a convolutional neural network, a long short-term memory recurrent neural network, as well as a bidirectional long short-term memory recurrent neural network. The NLU module 336 can receive the user query and can determine surface features and feature engineering, distributional semantic attributes, and joint optimizations of intent classifications and entity determinations, as well as rule based domain knowledge in order to generate a semantic interpretation of the user query. In some implementations, the NLU module 336 can include one or more of intent classifiers (IC), named entity recognition (NER), and a model-selection component that can evaluate performance of various IC and NER components in order to select the configuration most likely generate contextually accurate conversational results. The NLU module 336 can include competing models which can predict the same labels but using different algorithms and domain models where each model produces different labels (customer care inquires, search queries, FAQ, etc.).

The NLA ensemble 145 also includes a dialog manager (DM) module 338. The DM module 338 can select a next action to take in a query response dialog with a user. The DM module 338 can provide automated learning from user dialog and interaction data. The DM module 338 can implement rules, frames, and stochastic-based policy optimization with dialog state tracking. The DM module 338 can maintain an understanding of query response dialog context with the user and can generate more natural language interactions in a dialog by providing full context interpretation of a particular dialog with anaphora resolution and semantic slot dependencies. In new dialog scenarios, the DM module 338 can mitigate "cold-start" issues by implementing rule-based dialog management in combination with user simulation and reinforcement learning. In some implementations, sub-dialog and/or conversation automations can be reused in different domains.

The DM module 338 can receive semantic interpretations generated by the NLU module 336 and can generate a query response dialog response action using context interpreter, a dialog state tracker, a database of dialog history, and an ensemble of dialog action policies. The ensemble of dialog action policies can be refined and optimized using rules, frames and one or more machine learning techniques.

As further shown in FIG. 3, the NLA ensemble 145 includes a natural language generator (NLG) module 340. The NLG module 340 can generate a textual response based on the response action generated by the DM module 338. For example, the NLG module 340 can convert response actions into natural language and multi-modal responses that can be uttered or spoken to the user and/or can be provided as textual outputs for display to the user. The NLG module 340 can include a customizable template programming language which can be integrated with a dialog state at runtime.

In some implementations, the NLG module 340 can be configured with a flexible template interpreter with dialog content access. For example, the flexible template interpreter can be implemented using Jinja2, a web template engine. The NLG module 340 can receive a response action the DM module 338 and can process the response action with dialog state information and using the template interpreter to generate output formats in speech synthesis markup language (SSML), VXML, as well as one or more media widgets. The NLG module 340 can further receive dialog prompt templates and multi-modal directives. In some implementations, the NLG module 340 can maintain or receive access to the current query response dialog state, a query response dialog history, and can refer to variables or language elements previously referred to in a query response dialog. For example, a user may have previously provided the utterance "Can my 5'0" tall husband reach the ice maker?". The NLG module 340 can label a portion of the dialog as PERSON_TYPE and can associate a normalized GENDER slot value as FEMALE. The NLG module 340 can inspect the gender reference and customize the output by using the proper gender pronouns such as 'her, she, etc.'

Figure 4:
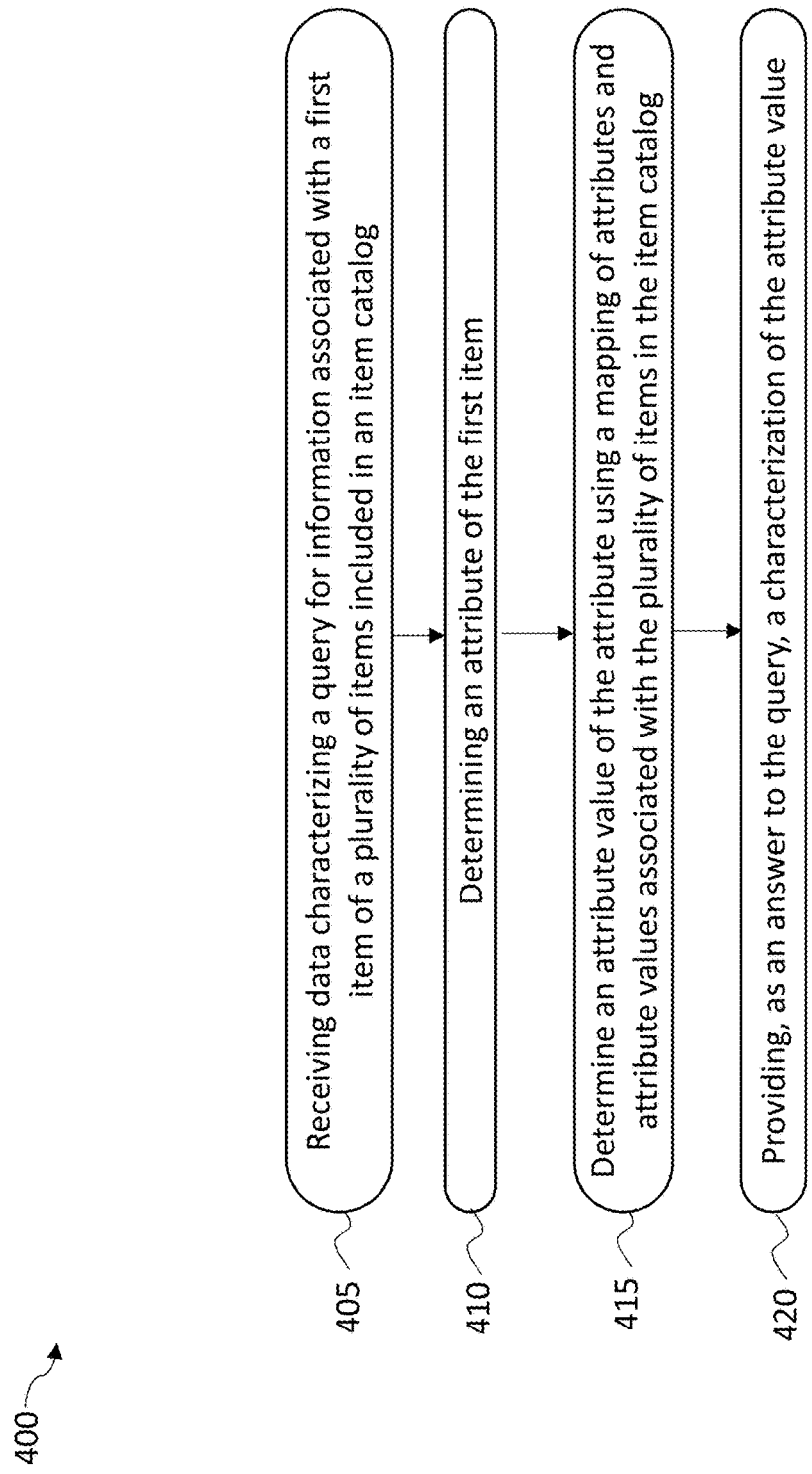
FIG. 4 is a flowchart illustrating an example method for providing an answer to a query via the question-answer expansion system described in FIG. 1.

FIG. 4 is a flowchart illustrating an example method 400 for providing an answer to a query via the QA expansion system described in FIG. 1. At 405, data characterizing a query for information associated with a first item of a plurality of items included in an item catalog can be received. For example, the data characterizing the query can be received by the client device 102 and provided to the QA processing platform 120. In some embodiments, the data characterizing the query can be received from a data source coupled to the client device 102 or the QA processing platform 120. For example, the data source can include a community generated question-answer data source. The community generated QA data source can include a web site or application that is not affiliated with a particular product or item, but includes questions and answers about a variety of products and items. In some embodiments, the data characterizing the query may be received in regard to a product review or a user inquiring about one or more aspects of a particular product available in the product catalog and/or via a product web site.

The data characterizing the query can include information about a broad range of aspects relating to the product. The data characterizing the query can include product availability, product features, and prices. Often, a user provides the query because there is insufficient information available to the user in the product catalog or the user has a specific intended use or inquiry about product details which is not readily available.

Data characterizing user queries is often provided to e-commerce platforms or web sites where a variety of products or items can be described or provided for sale. E-commerce websites are typically capable of capturing query data in the form of product questions, such as community or product question answering (PQA) data, that can be posted on the specific product description page and answered by product experts, e-commerce brand ambassadors, or other customers with experience with the actual product usage. Answers can be moderated, rated as useful, or deemed as not useful by other users. As result, the overall quality of the answers is relatively accurate and self-curated. PQA data is different from question-and-answer data that can be found it in websites such as Quora, Yahoo Answers, and Stack Overflow where the questions address a broad range of topics, and typically, the answers are lengthy and organized in conversational threads. PQA data is typically focused on questions related to products features, specification, usage, and facts. Additionally, PQA answers are typically shorter than the ones in online question and answer websites.

In addition, PQA data may not be available across all products in a product or item catalog. More popular products tend to receive greater attention of users, and thus, the PQA data associated with popular products can be richer and more robust compared to less popular products where users may have provided minimal or no PQA data.

At 410, an attribute of the first item can be determined. The determining can be performed using a predictive model trained using question-answer pair data associated with a portion of the plurality of items. The portion can include a second item as well as the first item.

Determining the attribute can include extracting a topic of the query and determining the attribute based on the query. Once determined, a similarity metric can be determined between the attribute and one or more attributes included in a mapping of attributes and attribute values. For example, the mapping can include data associated with all products in a product catalog, their corresponding attributes and attribute values. An updated mapping can be provided to include the determined attribute. In some embodiments, providing the updated mapping can include applying a threshold to the similarity metric and selecting an attribute whose similarity metric is above the threshold for inclusion in the updated mapping of attributes and attribute values.

In some embodiments, the attribute can be determined by applying entity tagging models to the query. Entity tagging can refer to the process of labelling (or tagging) word sequences that belong to the same entity. The word sequences can be labelled or tagged in a document or a text representing an answer to a question. For example, "liquid propane" is a sequence of words that can be labelled or tagged with a "fuel type" attribute and can be automatically identified by a sequence tagging model, based on the attribute, when the sequence of words is presented in a sentence. The entity tagging models can generalize and capture variations such as "propane" or "fuel propane".

In some embodiments, the attribute can be determined using unsupervised machine learning techniques, such as tree-cut models. Tree-cut models can implement methods to automatically detect and determine attributes in a sentence. The tree-cut models may not require annotated data for training. Tree-cut models can be applied to a data structure, such as a question tree data structure. A tree-cut model can be used to identify cuts or partitions in the question tree data structure corresponding to question topics and question focus. In some embodiments, the tree-cut model can include a minimum description length (MLD)-based model. MLD models can utilize taxonomies associated with questions to determine a topic profile and a specificity measure. A topic profile can include a probability distribution of the topics distributed into one or more topic categories. The topic categories can be leaf nodes of the tree data structure and each question can be tagged as associated with a leaf node. The specificity measure can measure the information needs of users for provide questions. For example, the specificity measure can be determined as the inverse entropy of a topic profile computed for a given term "t". A term with a high specificity measure can specify the question's topic, A term with a low specificity measure can specify the question's focus. The tree-cut models can also be used to determine a topic chain for a question. For example, for a question q a topic chain can be determined including a sequence of ordered topic terms such that the terms are ordered by specificity (from higher to lower). The tree-cut models can also be used to determine a prefix tree built over the topic chains extracted from the questions.

In some embodiments, the predictive model can be trained in a machine learning process. The training can include clustering the question-answer pair data associated with the plurality of items in the item catalog. The question-answer pair data can include a first data element characterizing a query or a question provided by a user for information associated with an item. The question-answer pair data can also include a second data element characterizing a natural language answer to the query or question. The predictive model can also be trained by determining at least one centroid question based on the clustering and categorizing the question-answer pair data based on the clustering. Outliers can be removed from the categorized question-answer pair data and an attribute can be associated with each question-answer pair.

In some embodiments, determining the attribute can also include determining a query type associated with the query. The type of query can be identified by comparing the query to existing questions or queries collected for a particular product or product category. The query type can be determined based on a clustering similarity metric, a text classification similarity metric, or comparison with stored or retrieved information. The stored or retrieved information can include product specific information and attribute data which may be included in product marketing or sales data, a product specification data sheet, or a comparison document comparing the product to one or more similar products in the same product category or the like.

In some embodiments, a clustering similarity metric can include a function that can quantify a measure of similarity between a numerical representation of a question and clusters of questions represented by centroids generated using a clustering technique as described herein. The clusters can represent questions that share the same topic. In some embodiments, the text classification similarity metric can include a function that can quantify a measure of similarity between two questions based on a numerical representation of two questions. For example, "fridges with an ice maker" and "fridges that have an ice maker" will have a high similarity measure.

Queries provided by a user can include one or more query types. The query types can include a factoid type, a confirmation type, a subjective type, an opinion type, or a miscellaneous type. In some embodiments, a factoid query type can include a question that is about one or more factual or specific aspects of an attribute of a product or item. For example, a factoid type query can include "What is the capacity of this refrigerator?" or "What are the dimensions of this lawnmower when it is folded up for storage?".

In some embodiments, a confirmation query type can include a question to confirm the presence of a product attribute or an attribute value. For example, a confirmation query type can include "Does this grill use propane?" or "Are the batteries for this model sold separately?". In some embodiments, a subjective query type can include a question that may include reference to a hypothetical situation or a personal usage of the product or item. For example, a subjective query type can include "Is this refrigerator large enough for my weekly grocery shopping?" or Will I get a low cut using this lawnmower?". In some embodiments, an opinion query type can include a question referring to opinions about a product. For example, an opinion query type can include "What is the best rated propane grill?" or "What do people say about this product?". In some embodiments, a miscellaneous query type can include any other query types that do not fall into other query types. For example, miscellaneous query types can include questions regarding recommendations or usage. Examples of miscellaneous query types can include "What would you recommend to wear with these shoes?", "Can I use this fertilizer in winter?", or "Would this cover fit my grill?".

Although subjective and opinion query types are useful to better understand how a product is perceived and used in the marketplace, factoid and confirmation query types can be more important in the pre-sale process since they provide concrete information about product attributes that are not easy to infer directly from the product catalog and are more likely to assist customers in the purchase decision process. In some embodiments, the query type can be determined based on classifying the query prior to determining the attribute of the first item.

At 415, an attribute value can be determined using a mapping of attributes and attribute values associated with the plurality of items in the item catalog. Entity tagging models or unsupervised machine learning techniques can be used to extract attribute values from the mapping of attributes and attribute values.

In some embodiments, the attribute value can be determined based on matching the attribute value to attribute values in the item catalog. In some embodiments, the attribute value can be determined based on a clustering similarity metric of the attribute value and at least one attribute value in the item catalog. In some embodiments, the attribute value can be determined based on a text classification similarity metric of the attribute value and at least one attribute value in the item catalog. In some embodiments, the attribute value can be determined based on retrieved or stored information corresponding to the attribute. The stored or retrieved information can include product specific information and attribute data which may be included in product marketing or sales data, a product specification data sheet, or a comparison document comparing the product to one or more similar products in the same product category or the like.

At 420, a characterization of the attribute value can be provided as an answer to the query and the answer can be provided to the user via the client device 102. In some embodiments, providing the answer can include generating the answer using a natural language engine based on the updated mapping of attributes and attribute values. For example, with reference to FIGS. 1 and 3, the NLA 145 can generate the answer in a natural language format.

Figure 5:
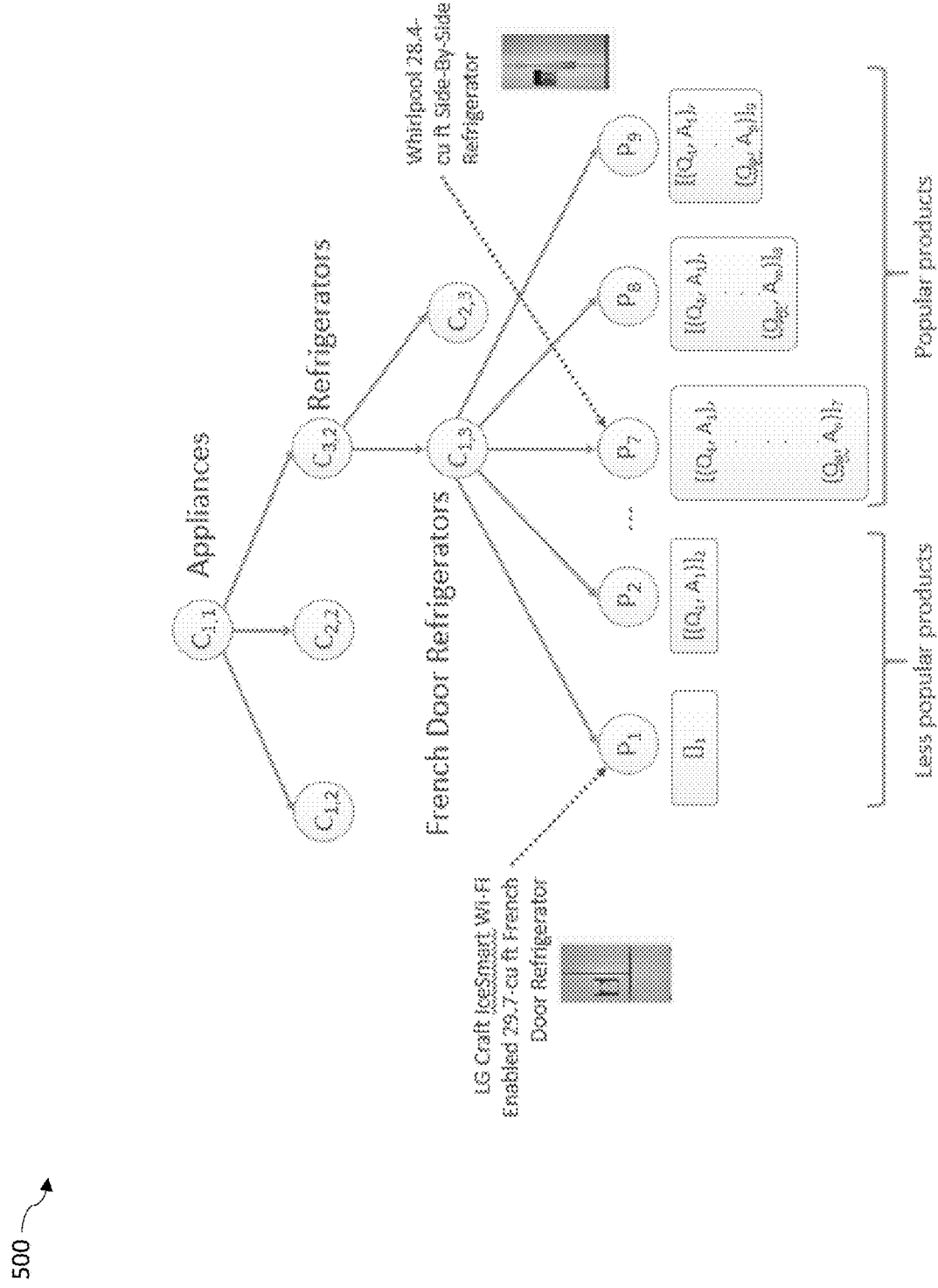
FIG. 5 is an example data structure used by the QA expansion system of FIG. 1.

FIG. 5 is an example data structure 500 used by the QA expansion system of FIG. 1. The data structure 500 can represent a taxonomy tree structure. Intermediate nodes can represent product categories and leaf nodes can represent products belonging to a particular product category. The tree structure 500 can form a hierarchical structure that identifies general or broad categories closer to the root (e.g., node $C_{1,1}$, "Appliances") and more specific product categories (e.g., node $C_{1,3}$, "French Door Refrigerators") away from the root node. For example, intermediate nodes $C_{1,1}$, $C_{3,2}$, and $C_{1,3}$ can represent a hierarchical product categorization in which $C_{1,1}$ represents "Appliances", $C_{3,2}$ represents "Refrigerators", and $C_{1,3}$ represents "French Door Refrigerators". Each leaf node $P_j$ can include one or more pairs of question-answer data (e.g., $Q_i, A_i$) associated with each product. Node $P_7$ can represent a specific product belonging to the category of "French Door Refrigerators". As noted in FIG. 5, node $P_7$ can be associated with a "Whirlpool 28.4 cu ft. Side-by-Side Refrigerator" for which a large amount of PQA data (e.g., query and response data) has been collected. For example, node $P_7$ has seven (7) pairs of question-answer data associated with it (e.g., $[(Q_1, A_1) \ldots (Q_n, A_n)]_7$. In contrast, node $P_1$ can represent a newer refrigerator, the "LG Craft IceSmart Wi-Fi Enabled 29.7 cu ft. French Door Refrigerator, that has been recently added to the product catalog and for which no PQA data (e.g., query and response data) has been collected or is available. For example, node $P_1$ has no (0) pairs of question-answer data associated with it (e.g., $[\ ]_1$).

Figure 6:
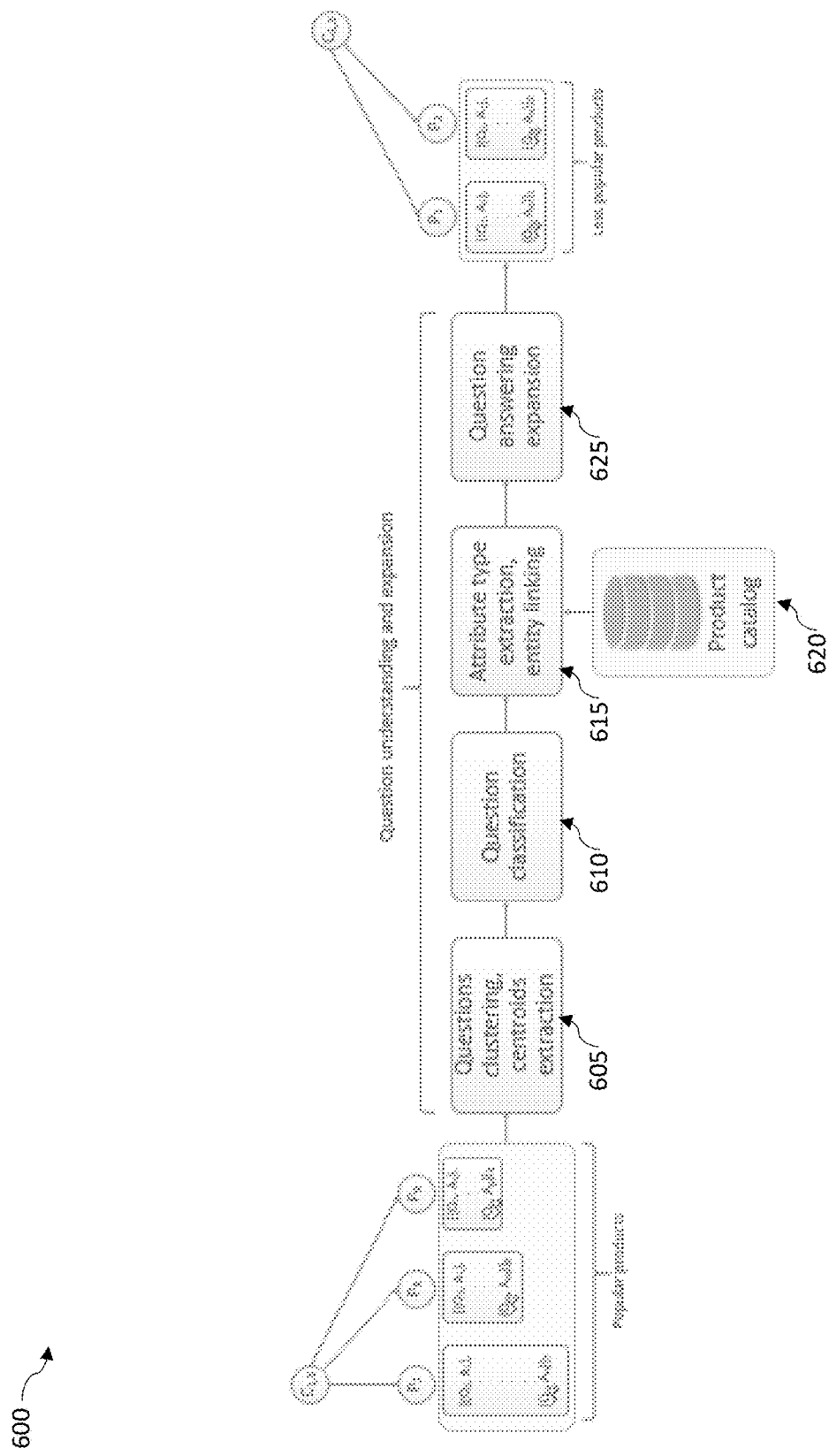
FIG. 6 illustrates an example workflow for expanding question-answer data associated with a first plurality of items to a second plurality of items using the QA expansion system of FIG. 1.

FIG. 6 illustrates an example workflow 600 for expanding question-answer data associated with a first plurality of items to a second plurality of items using the QA expansion system of FIG. 1. In some embodiments, the workflow 600 can be configured for real-time expansion of QA pair data to one or more products in a product or item catalog. In other embodiments, the workflow 600 can be configured for off-line processing and expansion of QA pair data to one or more products in a product or item catalog. The techniques described herein can utilize the workflow 600 to understand questions associated with QA pair data for a first set of products (e.g., popular products) and to expand the answers to a second set of products (e.g., less popular products). For example, as shown in FIG. 6, the workflow 600 can be used to determine query responses (e.g., answers) associated with nodes $P_1$ and $P_2$ based on QA pair data that has been processed in regard to nodes $P_7$, $P_8$, and $P_9$.

The workflow 600 can include a clustering step 605. In some embodiments, the clustering step 605 can include using deep learning clustering techniques, such as K-means, or Approximate Nearest Neighbors techniques, to cluster the QA pair data into clusters. In this way, each cluster can be associated to its centroid question.

The workflow 600 can also include a classification step 610. The classification step 610 can include classifying the QA pair data into categories using the cluster centroids or other classification techniques. In some embodiments, a human annotator can assign a label to each of the clusters identified in step 605. For example, if the QA pair data includes data related to a dimension attribute of a product, the cluster including these questions could be assigned a label related to a dimension, such as "dimensions_questions". In some embodiments, a pre-determined question taxonomy could be used to classify each cluster. In some embodiments, the QA pair data can be cleaned after classifying to remove spam questions, or unrelated questions from the original set of QA pair data. In this way, unrelated questions will not be erroneously associated with a cluster of questions and can be removed.

In step 615, product attributes can be extracted by tagging the QA pair data. Since each cluster may contain questions about multiple attributes, the QA pair data can be used to train an unsupervised predictive model to perform entity extraction. For example, a tree-cut model can be used to generate a list of attributes addressed by the question. The trained predictive model can extract the target topic of the questions. For example, the question "Does this fridge has an icemaker?" can be determined to include a target topic of "ice maker". In some embodiments, text classifiers can be trained to categorize the target attributes in the questions without identifying the specific location of the attributes in the questions. In some embodiments, a full entity tagger can identify the attributes and their location in the text. The full entity tagger can be configured and implemented as a predictive model trained with strong supervision. As a result, the full entity tagger can generate robust, highly accurate results. In some embodiments, full entity taggers can be trained from manually annotated data that include entities identified and tagged with respect to their position in a sentence. When a full entity tagger is trained in this manner, it can recognize and tag entities for instances in which the entity has not been observed before in the training data. The product catalog 620 can be used to train the predictive model.

At 625, QA pair data can be expanded to generate answer to questions associated with other products in the product catalog 620, such as the less popular products identified as nodes $P_1$ and $P_2$. For example, once the questions that refer to a given product in the product catalog 620 are identified, the answer can be constructed by leveraging the unsupervised predictive model and the attribute values for the product that are included in the product catalog 620. To generate answers for questions that are associated with less popular products (or any product in the product catalog for which the QA pair data does address), the target topics can be extracted from user queries using an unsupervised model, such as a tree-cut model. Entity linking can be performed to match the target topic of the query to one or more attributes in the product catalog 620. The product catalog 620 can include a taxonomy of products, product attributes, and the corresponding values of the product attributes.

In some embodiments, the entity linking can be performed using attribute lookups in the product catalog 620. In some embodiments, a more flexible information retrieval technique can be used. For example, in some embodiments, a technique such as term frequency-inverse document frequency (TF-IDF) or a bag-of-words retrieval function, such as BM25, can be used to speed up processing while maintaining accuracy. Once the linked attributes and the target product corresponding to the user's query are known, a text-based similarity metric can be determined between the product attributes and the detected attributes. The text-based similarity metric can be determined using a language model. In some embodiments, the language model can include a pre-trained language model configured to determine and generate contextual word embeddings. In some embodiments, the pre-trained language model can include a bidirectional encoder representation from transformer (BERT) model. The BERT model can pre-train deep bidirectional representations from unlabeled text by jointly conditioning on both left and right context in all layers. As a result, the pre-trained BERT model can be fine-tuned with just one additional output layer to create state-of-the-art models for a wide range of tasks, such as question answering and language inference, without substantial task-specific architecture modifications.

A threshold can be applied to retain only the most relevant attributes. The final attribute set is provided to a natural language generator, such as the NLA 145 described in relation to FIGS. 1 and 3, to produce a suitable natural language answer to be provided to the user via the client device 102.

Figure 7:
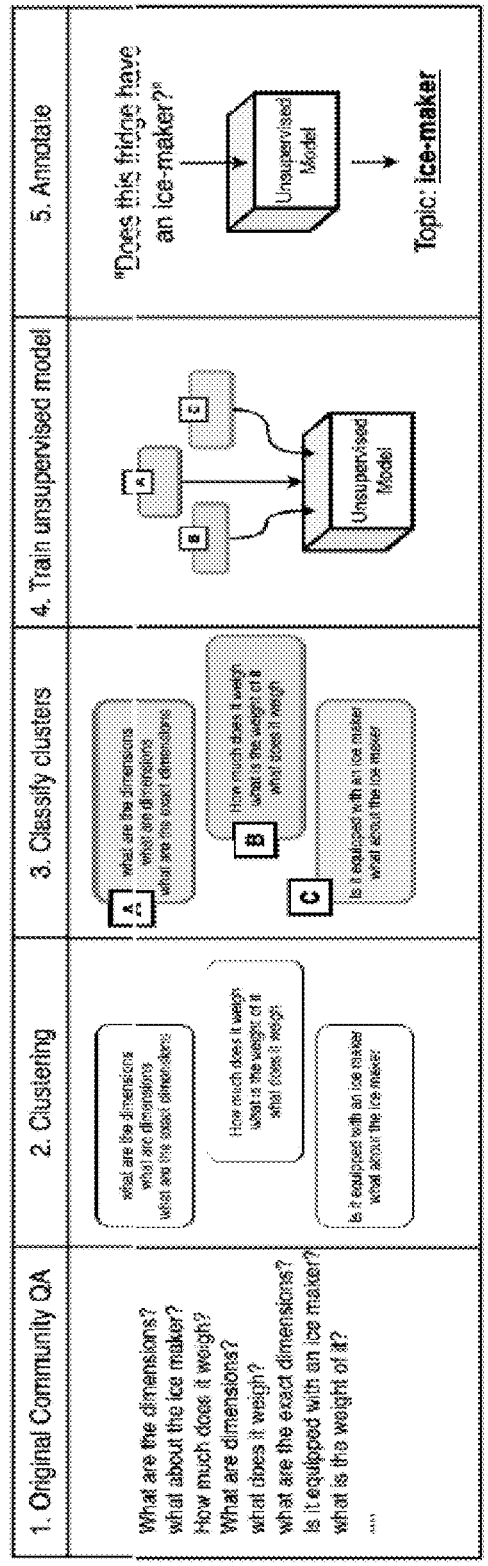
FIG. 7 is a table illustrating an example embodiment of expanding question-answer data via the QA expansion system of FIG. 1.

FIG. 7 is a table illustrating an example embodiment of expanding question-answer data via the QA expansion system of FIG. 1 using the workflow 600 of FIG. 6. As shown in FIG. 7, in step 1, questions can be received from a community of users or a data source associated with a community of users. In step 2, the questions can be clustered into different categories that are associated with the target topic of a question. In step 3, the clusters of questions can be classified and in step 4, the classified clusters can be provided to an unsupervised model trained to determine a topic for a question. In step 5, the unsupervised model has been trained as a predictive model to output a topic based on a question provided as an input.

Figure 8:
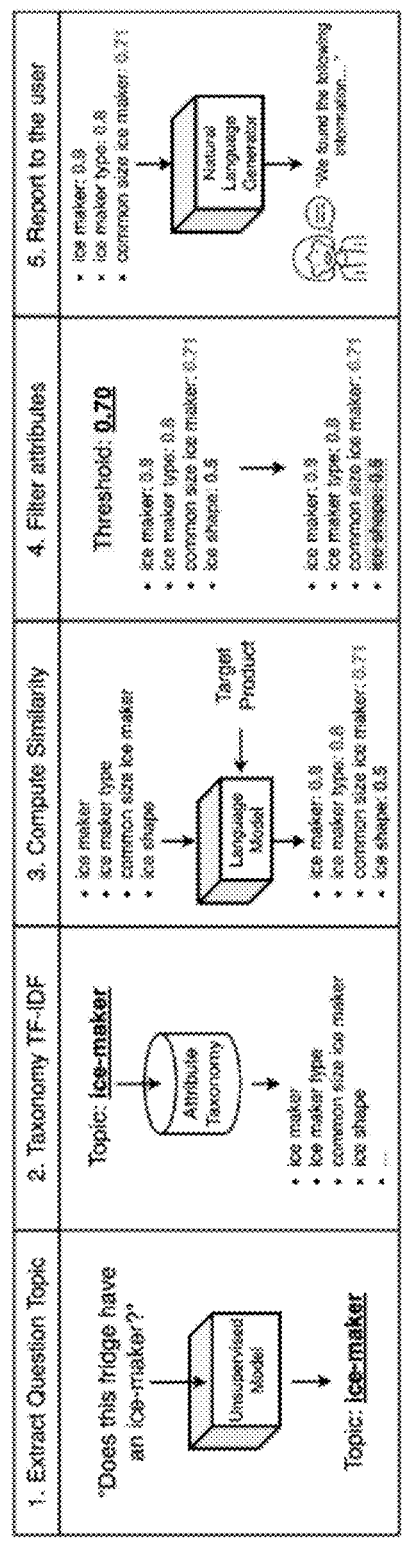
FIG. 8 is a table illustrating an example embodiment of a workflow for providing an answer to a query via the QA expansion system of FIG. 1.

FIG. 8 is a table illustrating an example embodiment of a workflow 800 for providing an answer to a query via the QA expansion system of FIG. 1. As shown in FIG. 8, the workflow 800 begins in step 1 when question is received. Given the question "Does this fridge have an ice-maker?", the unsupervised model can extract a topic, e.g., "ice-maker", of the question. In step 2, attributes in the product catalog which are determined to correlate to the extracted topic are determined using an entity look up or information retrieval technique, such as TF-IDF. For instance, a list of attributes including "ice maker", "ice maker type", "common size ice maker", and "ice shape" are obtained. In step 3, based on the product for which the user is providing the query, a similarity metric can be computed between the product attributes and the attribute list generated in step 2. A similarity metric value is determined for each attribute generated in step 2. For example, "ice maker" has a similarity metric value of 0.9, while "ice shape" has a similarity metric value of 0.5. In step 4, attributes are filtered and those having a similarity metric value below a predetermined threshold (e.g., 0.70) are discarded. In step 5, the remaining attributes are sent to a natural language generators, such as the NLA 145 described in FIG. 1, to determine an answer to the question. In some embodiments, to generate a complete answer with the current attribute values for the target product for which the question was received, the natural language generators can apply a template to format the answer. For example, the template can indicate "The refrigerator <refrigerator name> is equipped with an icemaker" in case the value of the attribute is true and "the refrigerator <refrigerator name> is not equipped with an icemaker" in case the attribute is false. When multiple attributes are present, they may be grouped in tables, for instance, "The refrigerator <refrigerator name> dimensions are the following <table with dimensions>".

Figure 9:
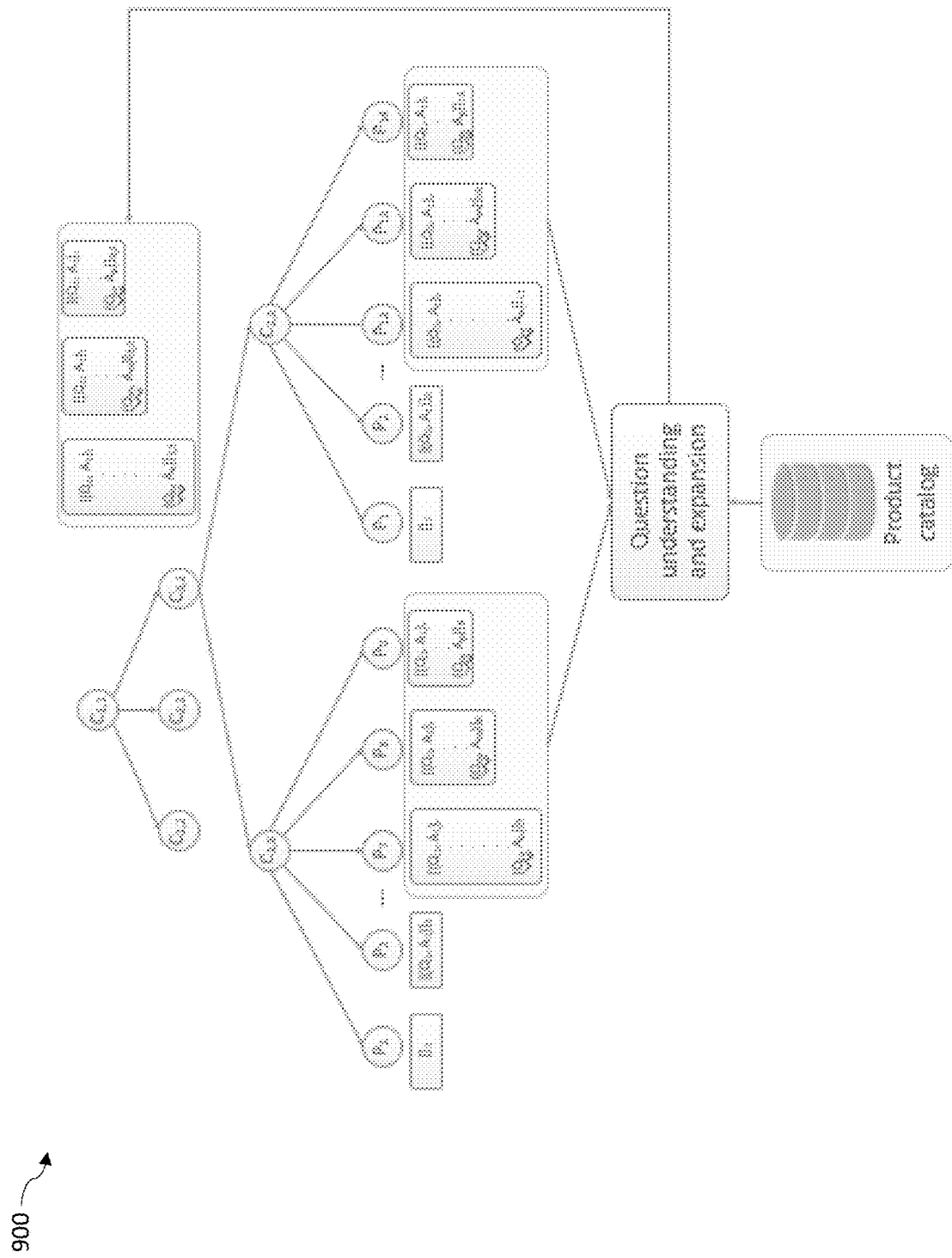
FIG. 9 is another example embodiment of expanding question-answer data to a third plurality of items via the QA expansion system of FIG. 1.

FIG. 9 is another example embodiment of expanding question-answer data to a third plurality of items via the QA expansion system of FIG. 1. As shown in FIG. 9, the question answer expansion system described herein can be used to expand answers to questions for a more general and broad range of products. For example, node $C_{3,2}$ can represent a broader product category that includes "Mini fridges", "Top-freezer refrigerators", Side-by-side refrigerators", and the like. The methods of QA understanding and expansion described herein can be applied to other product categories by processing all the questions that are available in the QA pair data associated with Refrigerators that are included in each of the child-nodes under node $C_{3,2}$.

Exemplary technical effects of the methods, systems, and computer-readable medium described herein include, by way of non-limiting example, processing a user query using a question-answer expansion system trained using question-answer pair data and generating answers to the user query. The question-answer expansion system can perform methods to determine answers to the query by evaluating attributes associated with a plurality of items in an item catalog and determining an attribute of an item described in the query. The question-answer expansion system can generate item-specific answers with little to no pre-configured attribute data for an item that is the subject of a user query. In this way, the question-answer expansion system can generate answers efficiently for items that are less popular or newly added to an item catalog and thus, improve the user experience when querying in regard to an item included in an item catalog. The question-answer expansion system can improve the accuracy and robustness of query dialogs using a catalog-to-dialog data structure incorporated into a machine learning process used to train classification algorithms configured to process the user query and generate query responses. The question-answer expansion system also provides improved interfaces for tenants to customize query dialog interfaces and provide more accurate query dialog responses based on integrated e-commerce data sources such as user account, billing, and customer order data.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, can be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising:
   receiving data characterizing a query for information associated with a first item of a plurality of items included in an item catalog;
   determining an attribute of the first item, wherein the determining is performed using a predictive model trained using a plurality of question-answer pair data associated with a portion of the plurality of items included in the item catalog, the portion including a second item, wherein the plurality of question-answer pair data includes at least one first data element characterizing a query for information associated with the second item and at least one second data element characterizing a natural language answer to the query for information associated with the second item;
   determining an attribute value of the attribute of the first item using a mapping of attributes and attribute values associated with the plurality of items in the item catalog; and
   providing, as an answer to the query for information associated with the first item, a characterization of the attribute value of the attribute of the first item.

2. The method of claim 1, wherein the portion of the plurality of items comprises the first item.

3. The method of claim 1, wherein determining the attribute comprises determining a query type associated with the query, the query type determined based on classifying the query prior to determining the attribute of the first item.

4. The method of claim 3, wherein the query type includes at least one of a factoid type, a confirmation type, a subjective type, an opinion type, or a miscellaneous type.

5. The method of claim 3, wherein the query type is determined based on at least one of a clustering similarity metric, a text classification similarity metric, or retrieved information.

6. The method of claim 1, wherein the attribute value is determined based on at least one of matching the attribute value to attribute values in the item catalog, a clustering similarity metric of the attribute value and at least one attribute value in the item catalog, a text classification similarity metric of the attribute value and at least one attribute value in the item catalog, or retrieved information corresponding to the attribute.

7. The method of claim 1, wherein determining the attribute further comprises extracting a topic of the query;
determining the attribute based on the topic of the query;
determining a similarity metric between the attribute and one or more attributes included in the mapping of attributes and attribute values; and
providing an updated mapping of attributes and attribute values including the determined attribute.

8. The method of claim 7, wherein providing the updated mapping of attributes and attribute values further comprises
applying a threshold to the similarity metric; and
selecting an attribute whose similarity metric is above the threshold for inclusion in the updated mapping of attributes and attribute values.

9. The method of claim 7, wherein providing the answer further comprises
generating the answer using a natural language engine based on the updated mapping of attributes and attribute values.

10. The method of claim 1, wherein training the predictive model comprises
clustering the plurality of question-answer pair data associated with the plurality of items in the item catalog;
determining at least one centroid question based on the clustering;
categorizing the plurality of question-answer pair data based on the clustering;
removing at least one outlier from the categorized plurality of question-answer pair data; and
associating an attribute with each question-answer pair included in the plurality of question-answer pair data.

11. The method of claim 1, wherein the query for information is received from a user in an electronic commerce platform.

12. The method of claim 1, wherein the item catalog includes a listing of the plurality of items, a listing of one or more attributes associated with each item of the plurality of items, and a listing of one or more attribute values associated with each of the one or more attributes.

13. The method of claim 1, wherein the attribute includes at least one of an item size, an item dimension, an item shape, an item configuration, an item feature, an item availability, an item component, an item usage, and/or an item price.

14. The method of claim 1, wherein the received data characterizing the query is received from a data source unaffiliated with the plurality of items in the item catalog, the data source including community generated question-answer pair data.

15. The method of claim 1, further comprising
generating a hierarchical data structure comprising a first set of nodes corresponding to a first plurality of question-answer pair data associated with attributes of the second item and at least one node corresponding to the first item;
determining a second plurality of question-answer pair data associated with attributes of the first item based on node locations of the first plurality of question-answer pair data associated with attributes of the second item; and
populating a second set of nodes of the hierarchical data structure with the second plurality of question-answer pair data, the second set of nodes corresponding to attributes of the first item.

16. The method of claim 15, wherein the first item is newly added to the item catalog and the second item existed previously in the item catalog prior to the addition of the first item to the item catalog.

17. A system comprising:
at least one data processor; and
a memory storing instructions, which, when executed by the at least one data processor cause the at least one data processor to perform operations comprising:
receiving data characterizing a query for information associated with a first item of a plurality of items included in an item catalog;
determining an attribute of the first item, wherein the determining is performed using a predictive model trained using a plurality of question-answer pair data associated with a portion of the plurality of items included in the item catalog, the portion including a second item, wherein the plurality of question-answer pair data includes at least one first data element characterizing a query for information associated with the second item and at least one second data element characterizing a natural language answer to the query for information associated with the second item;
determining an attribute value of the attribute of the first item using a mapping of attributes and attribute values associated with the plurality of items in the item catalog; and
providing as an answer to the query for information associated with the first item, a characterization of the attribute value of the attribute of the first item.

18. The system of claim 17, wherein the portion of the plurality of items comprises the first item.

19. The system of claim 17, wherein determining the attribute comprises determining a query type associated with the query, the query type determined based on classifying the query prior to determining the attribute of the first item.

20. The system of claim 19, wherein the query type includes at least one of a factoid type, a confirmation type, a subjective type, an opinion type, or a miscellaneous type.

21. The system of claim 19, wherein the query type is determined based on at least one of a clustering similarity metric, a text classification similarity metric, or retrieved information.

22. The system of claim 17, wherein the attribute value is determined based on at least one of matching the attribute value to attribute values in the item catalog, a clustering similarity metric of the attribute value and at least one attribute value in the item catalog, a text classification similarity metric of the attribute value and at least one attribute value in the item catalog, or retrieved information corresponding to the attribute.

23. The system of claim 17, wherein determining the attribute further causes the processor to perform operations comprising
extracting a topic of the query;
determining the attribute based on the topic of the query;
determining a similarity metric between the attribute and one or more attributes included in the mapping of attributes and attribute values; and
providing an updated mapping of attributes and attribute values including the determined attribute.

24. The system of claim 23, wherein providing the updated mapping of attributes and attribute values further comprises
applying a threshold to the similarity metric; and
selecting an attribute whose similarity metric is above the threshold for inclusion in the updated mapping of attributes and attribute values.

25. The system of claim 23, wherein providing the answer further comprises
generating the answer using a natural language engine based on the updated mapping of attributes and attribute values.

26. The system of claim 17, wherein training the predictive model comprises
clustering the plurality of question-answer pair data associated with the plurality of items in the item catalog;
determining at least one centroid question based on the clustering;
categorizing the plurality of question-answer pair data based on the clustering;
removing at least one outlier from the categorized plurality of question-answer pair data; and
associating an attribute with each question-answer pair included in the plurality of question-answer pair data.

27. The system of claim 17, wherein the query for information is received from a user in an electronic commerce platform.

28. The system of claim 17, wherein the item catalog includes a listing of the plurality of items, a listing of one or more attributes associated with each item of the plurality of items, and a listing of one or more attribute values associated with each of the one or more attributes.

29. The system of claim 17, wherein the attribute includes at least one of an item size, an item dimension, an item shape, an item configuration, an item feature, an item availability, an item component, an item ranking, an item capacity, an item usage, and/or an item price.

* * * * *